United States Patent [19]

Deubzer et al.

[11] 4,170,610

[45] Oct. 9, 1979

[54] PREPARATION OF CROSS-LINKED MODIFIED ORGANOPOLYSILOXANES

[75] Inventors: Bernward Deubzer, Burghausen, Fed. Rep. of Germany; Erich Brunner, Gmunden, Austria

[73] Assignee: Wacker-Chemie GmbH, Munich, Fed. Rep. of Germany

[21] Appl. No.: 895,835

[22] Filed: Apr. 13, 1978

[30] Foreign Application Priority Data

Apr. 28, 1977 [DE] Fed. Rep. of Germany ....... 2718998

[51] Int. Cl.$^2$ .................................................. C08F 283/12
[52] U.S. Cl. .................................................. 525/100
[58] Field of Search .................... 260/827, 825; 528/11

[56] References Cited

U.S. PATENT DOCUMENTS

| | | | |
|---|---|---|---|
| 3,487,123 | 12/1969 | Bauer et al. | 260/827 |
| 3,932,555 | 1/1976 | Goodrich et al. | 260/827 |

*Primary Examiner*—Wilbert J. Briggs, Sr.

[57] ABSTRACT

A process for preparing cross-linked, modified organopolysiloxanes which comprises polymerizing at least one monomer having at least one aliphatic multiple bond in the presence of a free radical initiator and at least one cross-linked organopolysiloxane containing at least 40 mol percent of monoorganosiloxane units. When the organopolysiloxane is not crosslinked, then the polymerization of the monomer having at least one aliphatic multiple bond is conducted in the presence of an organopolysiloxane having at least 40 mol percent mono-organosiloxane units, and a free radical initiator and a catalyst which promotes cross-linking of the organopolysiloxane.

22 Claims, No Drawings

PREPARATION OF CROSS-LINKED MODIFIED ORGANOPOLYSILOXANES

The present invention relates to cross-linked modified organopolysiloxanes and particularily to a process for preparing cross-linked modified organopolysiloxanes by polymerizing a monomer containing at least one aliphatic multiple bond in the presence of a cross-linked organopolysiloxane and a free radical initiator. More particularily, the present invention relates to a process for preparing cross-linked modified organopolysiloxanes by polymerizing a monomer having at least one aliphatic multiple bond in the presence of an organopolysiloxane capable of being cross-linked, a free radical initiator and a catalyst which promotes cross-linking of the organopolysiloxane.

BACKGROUND OF THE INVENTION

The cross-linked modified organopolysiloxanes obtained from the present process are more transparent and/or are much more rigid than the products which have been obtained heretofore from the processes described in the prior art. The improved properties are achieved primarily by polymerizing monomers containing aliphatic multiple bonds in the presence of organopolysiloxanes containing at least 40 mol percent of mono-organosiloxane units, but simultaneously in the presence of a condensation catalyst for the organopolysiloxane, or in the presence of a catalyst which promotes the addition of Si-bonded hydrogen to Si-bonded alkenyl groups.

German Pat. No. 1,957,356, refers to the reaction of condensable groups of a condensable organopolysiloxane with an acrylester having alcoholic hydroxyl groups and the polymerization of vinyl monomers in the presence of the acryl-siloxane-resin thus obtained. Compared to this process, the process of this invention offers at the very least the advantage that it is far less expensive. U.S. Pat. No. 2,958,707 refers to the polymerization of at least one monomer containing at least one aliphatic multiple bond in the presence of free radicals and at least one organopolysiloxane, in which the organopolysiloxane may contain at least 40 mol percent of mono-organopolysiloxane units and condensable groups which are Si-bonded hydroxyl groups and/or alkoxy groups having from 1 to 3 carbon atoms. In this patent, acrylamide is disclosed as one of the monomers containing aliphatic multiple bonds. However none of the examples of U.S. Pat. No. 2,958,707 describe the preparation of a product having measurable rigidity. Also, German Pat. No. 968,056, describes a process for the preparation of molded objects and coatings in which polymerization products are obtained from monomers of unsaturated polymerizable hydrocarbon compounds and low-polymer silicones and are molded and hardened, i.e. cross-linked, at an elevated temperature. Because of the low ratio of methyl magnesium chloride to silicon tetrachloride present during the preparation of the organopolysiloxanes used pursuant to Example 1 of German Pat. No. 968,056, it can be assumed even in contrast to the cited formula at page 1 of said German Patent, that the organopolysiloxane also contains at least 40 mol percent of mono-organosiloxane units. Compared to the products which presumably can be obtained in accordance with the teachings of the German Patent, the products which can be obtained in accordance with the process of this invention are more transparent and/or more rigid than the products described in the prior art.

It is therefore an object of this invention to provide cross-linked, modified organopolysiloxanes having improved transparency. Another object of this invention is to provide cross-linked, modified organopolysiloxanes having improved strength and rigidity. Still another object of this invention is to provide a process for preparing cross-linked, modified organopolysiloxanes having improved rigidity and transparency. A further object of this invention is to provide a process for preparing modified organopolysiloxanes by polymerizing a monomer having an aliphatic multiple bond in the presence of a cross-linked organopolysiloxane. A still further object of this invention is to provide a process for preparing modified organopolysiloxanes by simultaneously cross-linking an organopolysiloxane while polymerizing a monomer having an aliphatic multiple bond.

SUMMARY OF THE INVENTION

The foregoing objects and others which will become apparent from the following description are accomplished in accordance with this invention, generally speaking by providing a process for preparing cross-linked, modified organopolysiloxanes which comprises polymerizing at least one monomer having aliphatic multiple bonds in the presence of an organopolysiloxane containing at least 40 mol percent of mono-organosiloxane units which has been cross-linked or is capable of being cross-linked either by the condensation reaction or by the addition of Si-bonded hydrogen atoms to Si-bonded alkenyl groups. Where the organopolysiloxane has been cross-linked, then the polymerization of the monomer is conducted in the presence of an organopolysiloxane and a free radical initiator. However, when the organopolysiloxane is not cross-linked, then the polymerization is conducted in the presence of the organopolysiloxane, free radical initiator and a catalyst which promotes cross-linking through the condensation reaction or the addition of the Si-bonded hydrogen atoms to the Si-bonded alkenyl groups. When the organopolysiloxane is to be cross-linked by the addition of Si-bonded hydrogen atoms to the Si-bonded alkenyl groups, it may be necessary to add at least one organosilicon compound containing at least two Si-bonded hydrogen atoms per molecule prior to or during the polymerization reaction.

DETAILED DESCRIPTION OF THE INVENTION

In the process of this invention it is possible to use all monomers which contain at least one aliphatic multiple bond and could have been polymerized in the presence of a free radical initiator and organopolysiloxanes. Examples of suitable monomers are hydrocarbons containing at least one aliphatic multiple bond, such as ethylene, propylene, butylene, isoprene, butadiene, trivinylcyclohexane, vinylnaphthalene, styrene, alphamethylstyrene, vinyltoluene and p-divinylbenzene; vinyl halides such as vinyl fluoride and vinyl chloride; vinyl esters of organic acids, such as vinyl acetate; chlorine-substituted styrenes such as o-chlorostyrene and o,o-dichlorostyrene; heterocyclic vinyl compounds, such as vinylpyridine, N-vinylcarbazole, N-vinylpyrrolidone and N-vinylcaprolactam, acrylic acid and acrylic acid derivatives such as acrylamide, acrylonitrile and acrylic acid esters of monovalent alcohols, such as ethyl acrylate and n-butyl acrylate, or polyvalent alcohols such as pentaerythritol tetracrylate; vinylidene fluoride, vinylidene chloride, vinylidene cyanide, methacrylic acid and methacrylic acid derivatives such as methacrylamide, methacrylonitrile and methacrylic acid esters of monovalent alcohols, such as methyl methacrylate, n-butyl methacrylate and allyl methacrylate, or polyvalent alcohols, such as trimethylolpropane trimethacrylate; allyl compounds other than allyl metacrylate, such as triallyl cyanurate, diallyl cyanurate, diallyl isocyanurate, crotonic acid diallyl ester, diallyl phthalate, diallyl fumarate, dimethallyl terephthalate, as well as pentaerythritol allyl ether and trimethalylpropane allyl ether.

The monomers may be used singly or in combination of two or three or even more. It is possible, for example to use n-butyl methacrylate as the sole monomer in the reactive mixture or to use mixtures comprising two or three or more of monomers having aliphatic multiple bonds. Examples of mixtures of monomers which may be used are styrene and n-butyl acrylate, ethylene and vinyl acetate, as well as mixtures containing an acrylester and acrylonitrile both of which can be substituted; as well as mixtures of ethyl acrylate and methacrylonitrile. Furthermore it is possible to use mixtures of one or several of the aforementioned monomers and polymers having aliphatic multiple bonds such as unsaturated polyesters, or monomers which polymerize readily with other monomers, such as maleic acid anhydride, fumaric acid esters other than diallylfumarate, stilbene, indene and cumarone.

Preferred monomers having at least one aliphatic multiple bond are those which can be readily mixed with the organopolysiloxane at the polymerization temperature of the monomer and/or at the cross-linking temperature of the organopolysiloxane either in the presence or absence of an inert solvent such as xylene.

It is preferred that the monomer containing an aliphatic multiple bond be employed in amounts of at least 5 percent by weight, more preferably in amounts of at least 20 percent by weight and up to 95 percent by weight, based on the total weight of the monomer containing the aliphatic multiple bond and the organopolysiloxane. When the monomer containing the aliphatic multiple bond is used in an amount of less than about 50 percent by weight based on the total weight of the monomer and the organopolysiloxane, products having excellent heat resistant and good electrical properties are obtained. When the monomer containing the aliphatic multiple bond is used in excess of 50 percent by weight based on the total weight of the monomer and the organopolysiloxane, then products having exceptionally good mechanical properties are obtained, which are resistant to water, sun and chalking.

It is preferred that the organopolysiloxane contain at least 40 mol percent of mono-organosiloxane units and the remaining siloxane units be diorganosiloxane units, triorganosiloxane units and/or $SiO_{4/2}$ units. Moreover, it is preferred that the organopolysiloxne contain no more than about 55 mol percent of diorganosiloxane units and that the triorganosiloxane units and the $SiO_{4/2}$ units account for no more than about 10 mol percent and more preferably no more than about 5 mol percent. Up to about 10 percent of the number of organic radicals present in these organosiloxane units can be substituted with hydrogen.

Mono-organosiloxane units can be represented by the general formula: $RSiO_{3/2}$, diorganopolysiloxane units can be represented by the general formula: $R_2SiO$ and triorganosiloxane units can be represented by the general formula $R_3SiO_{1/2}$. In all of these formulas, R represents a hydrocarbon radical or a substituted hydrocarbon radical which preferably contains from 1 to 12 carbon atoms.

Examples of hydrocarbon radicals represented by R are alkyl radicals, such as the methyl, ethyl, n-propyl, isopropyl, n-butyl and sec-butyl radicals, as well as octyl and dodecyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radicals such as the tolyl radicals; and aralkyl radicals such as the benzyl radical. Examples of substituted hydrocarbon radicals represented by R are halogenated hydrocarbon radicals, such as the 1,1,1-trifluoropropyl radical and the alpha,alpha,alpha-trifluorotolyl radical, as well as the chlorophenyl and dichlorophenyl radicals.

Because of their availability, it is preferred that at least 50 percent of the number of R radicals be methyl radicals and that on the whole at least 75 percent of the number of R radicals be methyl and phenyl radicals.

When the organopolysiloxanes having at least 40 mol percent of mono-organosiloxane units are to be cross-linked by condensation, then they must contain a total of at least 0.1 percent by weight of Si-bonded hydroxyl groups and/or SiOC bonded alkyl groups having from 1 to 8 carbon atoms, such as the previously mentioned alkyl groups with from 1 to 8 carbon atoms. However it is preferred that these alkyl groups contain from 1 to 3 carbon atoms.

When the organopolysiloxanes having at least 40 mol percent of mono-organosiloxane units are to be cross-linked by the addition of Si-bonded hydrogen atoms to alkenyl groups, then they must contain at least 0.1 percent by weight of alkenyl radicals and more preferably from 1 to 25 percent of the number of R radicals are alkenyl radicals, particularily vinyl radicals.

It is preferred that the organopolysiloxanes containing at least 40 mol percent of mono-organosiloxane units be methyltrichlorosilane hydrolysates which contain a total of at least 0.1 percent by weight of Si-bonded hydroxyl groups and/or SiOC bonded alkyl radicals. The hydrolysates may also contain up to 25 mol percent of dimethyldichlorosilane or methyltriethoxysilane and up to 25 mol percent of diethoxysilane. Additional examples of organopolysiloxanes which can be cross-linked by condensation and which contain at least 40 mol percent of monoorganosiloxane units are those having an average of from 0.3 to 1.2 phenyl radicals per Si-atom, and on the average from 0.9 to 1.7 SiC-bonded organic radicals per Si-atom with a total of at least 0.1 percent by weight of Si-bonded hydroxyl groups and/or SiOC bonded alkyl radicals. Organopolysiloxanes such as described above are well known in the art.

Other organopolysiloxanes containing at least 40 mol percent of mono-organosiloxane units are those obtained through the hydrolysis of mono-organosilanes of the general formula:

$$RSiX_3$$

where X represents a hydrolyzable group, for example an ethoxy group or a hydrolyzable atom, such as chlorine; and where R is the same as above; or mixtures of silanes having the general formula:

$$R_aSiX_{4-a}$$

where R and X are the same as above and a is 0, 1, 2 or 3, provided that these mixtures contain at least 40 mol percent of silanes of the formula:

$RSiX_3$.

in the presence of diorganopolysiloxanes.

In the polymerization of a monomer which contains at least one aliphatic multiple bond, in the presence of at least one organopolysiloxane which can be cross-linked by condensation or through the addition of Si-bonded hydrogen to alkenyl groups and which organopolysiloxane contains at least 40 mol percent of mono-organosiloxane units, it is preferred that free radicals be obtained via organic peroxide compounds. However it is possible to use other free radical initiators in the polymerization. Examples of other free radical initiators are azo compounds in which the two nitrogen atoms of the azo group are linked to tertiary carbon atoms and the remaining valences of the tertiary carbon atoms are saturated with nitrile, carboxyl, cycloalkylene or alkyl groups; enolizable alpha-phenylcarbonyl compounds, sulfinic acids and energy-rich rays, such as alpha, beta, or gamma rays or ultraviolet rays, as well as by the thermal initiation of free radicals.

Examples of preferred free radical initiators are diacyl peroxides, such as benzoyl peroxide and lauroyl peroxide; hydrocarbon-hydroperoxides, such as tert-butyl hydroperoxide, cumene hydroperoxide and decahydronaphthalene hydroperoxide; dihydrocarbon peroxides, such as di-tert-butyl peroxide and dicumyl peroxide; perketals such as 1,1-di-tert-butylperoxide-3,3,5-trimethylcyclohexane; peresters such as tert-butyl perbenzoate, tert-butylperoxy isopropyl carbonate, tert-butyl perpivalate, tert-butyl peroctoate, tert-butyl cyclohexyl carbonate and tert-butyl permaleinate and acetylcyclohexanesulfonyl peroxide.

Mixtures of various peroxides may be employed in the generation of free radicals.

The amount of free radical initiator used is not critical. Generally as little as 0.0005 up to about 5 percent by weight and more preferably from 0.003 to 2 percent by weight, based on the weight of the monomer containing an aliphatic multiple bond and the organopolysiloxanes can be employed.

These free radical initiators can be employed in a number of ways. For example, when the half-life of the free radical initiator in toluene is more than 2 hours at the polymerization temperature then a portion of the total amount or the total amount of free radical initiator can be mixed with the organopolysiloxanes and/or monomers containing an aliphatic multiple bond. Likewise, when the half-life of the free radical initiator is less than 2 hours at the polymerization temperature, then the free radical initiator can be added in increments or continuously during the polymerization with the mixture of monomer having aliphatic multiple bonds and the organopoly siloxane.

The polymerization may be conducted in the absence or presence of an inert liquid. The liquid should be inert to the organopolysiloxanes and the monomers and the polymers produced as a result of the polymerization. Moreover, the inert liquid may be a nonsolvent for the polymerization products, i.e., the polymerization products are not soluble to an appreciable extent in the inert liquid. However, a mixture of solvents may be employed in which the organopolysiloxanes and monomer containing an aliphatic multiple bond as well as the polymerization products are soluble. Also, it is possible to conduct the polymerization in the presence of water as an emulsion or suspension polymerization. In certain cases it may be desirable to use from 1 to 20 percent by weight of water, based on the total weight of the organopolysiloxanes and the monomer containing an aliphatic multiple bond, in order to facilitate removing the heat of polymerization.

Other inert liquids which may be employed as reaction mediums are those having low chain transfer constants. Examples of inert liquids which may be used are hydrocarbons such as hexane, n-heptane, benzene, toluene; chlorinated hydrocarbons such as chlorobenzene, 1,1,2,2-tetrafluorodichloroethane an monofluorotrichloromethane; esters such as methyl acetate and ethyl acetate; and alcohols such as methanol and n-butanol.

Temperatures and pressures which have been used heretofore in the polymerization of monomers having at least one aliphatic multiple bond in the presence of free radicals and organopolysiloxanes, can be used in the process of this invention. Temperatures in the range of from 50° to 200° C. and pressures on the order of 0.1 to 20 atmospheres are preferred.

Surprisingly, polymerization of monomers containing an aliphatic mutiple bond in the presence of organopolysiloxanes which are cross-linked or capable of being cross-linked can take place in atmospheric air without inhibiting the polymerization and without the exposed surfaces becoming tacky. (See German Patent Application No. 1,646,215.)

When the organopolysiloxanes which contain at least 40 mol percent of mono-organosiloxane units are of a type which can be cross-linked by condensation, then the process of this invention must be carried out in the presence of a condensation catalyst for the organopolysiloxanes. It is possible to use all catalysts which could have been used heretofore in the condensation of condensable organosiloxanes containing at least 40 mol percent of mono-organosiloxane units. Preferably the condensation catalysts are organic compounds such as acylates, alcoholates and chelates, especially acetylacetonate of the elements of the second, third and/or the fourth principal group of the Mendeleef Periodic Table and the transition metals of the first to the eighth subgroup of the Mendeleef Periodic Table as well as those in the lanthanium series. Examples of such catalysts are the Pb, Al, Zn, Co, Ti and Sn acylates, alcoholates and chelates. Specific examples of preferred catalysts are lead-2-ethylhexoate, lead naphthenate, zinc naphthenate, zinc-2-ethylhexoate, tin-2-ethylhexoate, dibutyltin diacetate, dibutyltin dilaurate, cobalt-2-ethylhexoate, cobalt naphthenate, aluminum naphthenate, aluminum triacetylacetonate, aluminum isopropylate and polymeric butyl titanate, as well as ferric naphthenate, calcium naphthenate, cernaphthenate and cer-2-ethylhexoate. Additional examples of condensation catalysts are inorganic lead compounds, such as lead carbonate, basic lead carbonate, as well as the compounds having the formula: $Pb_3(OH)_2(CO_3)$, lead monoxide and lead dioxide, quaternary ammonium compounds, such as tetramethylammonium acetate and tetramethylammonium hydroxide.

Mixtures of various condensation catalysts may also be employed.

It is preferred that condensation catalysts be used in amounts of from 0.001 to about 2 percent by weight, based on the total weight of the monomer containing an aliphatic multiple bond and the organopolysiloxanes.

When the organopolysiloxanes having at least 40 mol percent of mono-organosilane units are of a type which can be cross-linked by the addition of Si-bonded hydrogen to Si-bonded alkenyl groups, then the process of this invention must be carried out in the presence of a catalyst which promotes the addition of Si-bonded hydrogen to Si-bonded alkenyl groups and, when the organopolysiloxanes do not yet contain sufficient Si-bonded hydrogen atoms, then the process must be carried out following the addition of at least one organosilicon compound having at least 2 Si-bonded hydrogen atoms per molecule. Catalysts which promote the addition of Si-bonded hydrogen to Si-bonded alkenyl groups are the same as those catalysts which could have been used heretofore to promote the addition of Si-bonded hydrogen to Si-bonded alkenyl groups. Examples of such catalysts are metallic and finely dispersed platinum, ruthenium, rhodium, palladium and iridium. These metals can be applied to carriers such as silicon dioxide, aluminum oxide or activated carbon. Also it is possible to use compounds or complexes of said elements, such as platinum halides, for example $PtCl_4$, chloroplatinic acid, $Na_2PtCl_4 \cdot H_2O$, platinum-olefin complexes, platinum-alcohol complexes or platinum-alcoholate complexes, platinum-ether complexes, platinum-aldehyde complexes, platinum-ketone complexes and platinum-vinylsiloxane complexes, especially platinum-divinyl-tetramethyldisiloxane complexes. These complexes may contain or be free of a detectable amount of halogen. Other catalysts which may be used are iron, nickel and cobalt carbonyls.

When the previously mentioned platinum compounds and/or platinum complexes are used as catalysts for the addition of Si-bonded hydrogen to Si-bonded alkenyl groups, the catalysts are generally used in amounts of from 0.5 to about 500 ppm by weight and more preferably from about 2 to 400 ppm by weight, calculated on the basis of the platinum and based on the weight of the monomer containing an aliphatic multiple bond and the organopolysiloxanes.

Organosilicon compounds which contain at least 2 Si-bonded hydrogen atoms per molecule which may be used in the process of this invention are those organosilicon compounds which could have been used heretofore for cross-linking organopolysiloxanes with or without mono-organosilane units, by the addition of Si-bonded hydrogen to alkenyl groups. Generally, these organosilicon compounds are organopolysiloxanes in which the silicon valences that are not saturated by hydrogen atoms and siloxane-hydrogen atoms, are saturated by alkyl radicals such as methyl or ethyl radicals and/or phenyl radicals.

Organosilicon compounds containing at least 2 Si-bonded hydrogen atoms per molecule are preferably used in amounts of from 0.1 to 15 Si-bonded hydrogen atoms per Si-bonded aliphatic multiple bond.

Depending upon the activity and the amount of the condensation catalyst or of the catalyst which promotes the addition of Si-bonded hydrogen to Si-bonded alkenyl groups, cross-linking of the organopolysiloxanes is carried out at temperatures ranging from room temperature up to about 250° C. It is possible to insure that cross-linking of the organopolysiloxanes occurs prior to polymerization and/or simultaneously with the polymerization and/or subsequent to the polymerization of the monomer containing an aliphatic multiple bond by selecting the proper type and amount of catalyst. When it is desired to produce transparent products, it is preferred that the type and amount of cross-linking catalyst or the catalyst system for the polymerization of the monomer having an aliphatic multiple bond, be selected so that the cross-linking of the organopolysiloxane takes place prior to the polymerization of the monomer having aliphatic multiple bond or at least that cross-linking of the organopolysiloxane takes place before the polymerization of the monomer having the aliphatic multiple bond is completed.

It is surprising that cross-linking of organopolysiloxanes containing at least 40 mol percent of mono-organosiloxane units prior to the completion of the polymerization of monomers having an aliphatic multiple bond promotes rather than impedes the uniform distribution of the organopolysiloxanes in the polymer resulting from the polymerization of the monomer. Moreover, fine-meshed cross-linking of the organopolysiloxanes enhances the homogeneous distribution of the polymer in the organopolysiloxanes, thereby resulting in the production of transparent products.

Other additives which have been or could have been employed heretofore in the preparation of polymers from at least one monomer having at least one aliphatic multiple bond and/or which could be used in the preparation of compositions based on cross-linkable organopolysiloxanes can be used in the process of this invention.

Examples of such additives are pigments which may be used to impart a certain color to the finished products; fillers such as titanium dioxide and/or glass fibers; antioxidants, accelerators such as cobalt-2-ethylhexoate, promoters, inhibitors, ultraviolet ray absorbents and protective colloids.

By using accelerators or promoters, the polymerization of monomers having an aliphatic multiple bond can also be carried out at temperatures below 50° C., for example at room temperature.

The process of this invention can be used for preparing compositions which can be used to form molded objects, as coatings and for filling interstices and in the manufacture of electronic components.

In the following examples, all parts and percentages are by weight unless otherwise specified. The resistance of the product to bending is tested in accordance with DIN 53452, while the resistance to impact is tested in accordance with DIN 53453, using standard rod-shaped samples of the product.

EXAMPLE 1

About 75 parts of an organopolysiloxane containing 95 mol percent of $CH_3 SiO_{3/2}$ units and 5 mol percent of $(CH_3)_2 SiO$ units, which contains 1 percent Si-bonded hydroxyl groups and 3 percent Si-bonded ethoxy groups are dissolved in 25 parts of styrene to form a clear solution.

A portion of the clear solution prepared above is mixed in the amount indicated with each of the organic peroxide compounds and condensation catalysts listed in Table 1 and immediately heated in metal plates to 110° C. for 4 hours.

EXAMPLE 2

The process described in Example 1 is repeated, except that 75 parts of n-butyl methacrylate are substituted for the styrene. The results are shown in Table 1.

TABLE 1

| Example | Condensation Catalyst | Percent (2) | Peroxide Compound | Percent (2) | Appearance of molded object | Bending Resistance $N/mm^2$ | Impact Resistance $kJ/m^2$ |
|---|---|---|---|---|---|---|---|
| 1-($V^1$) | — | — | tert-butyl perbenzoate | 2 | Milky opaque | 0 | 0 |
| 1-(a) | Al-triacetyl-acetonate | 0.1 | tert-butyl perbenzoate | 2 | Transparent | 31.0 | 4.0 |
| 1-(b) | Al-triacetyl-acetonate | 0.1 | Dicumylperoxide | 2 | Transparent | 31.0 | 6.2 |
| 1-(c) | lead-2-ethyl-hexoate | 0.005 | tert-butyl perbenzoate | 2 | Transparent | 17 | 2.1 |
| 1-(d) | lead-2-ethyl-hexoate Dibutyltin dilaurate | 0.01 0.01 | tert-butyl perbenzoate | 2 | Transparent | 25 | 2.7 |
| 2-($V^1$) | — | 0 | tert-butyl perbenzoate | 2 | Milky opaque | 0 | 0 |
| 2-(a) | Al-triacetyl-acetonate | 0.1 | tert-butyl perbenzoate | 2 | Transparent | 26 | 4.4 |
| 2-(b) | Al-triacetyl-acetonate | 0.1 | Dicumylperoxide | 2 | Transparent | 27 | 5.1 |
| 2-(c) | lead-2-ethyl hexoate | 0.5 | tert-butyl perbenzoate | 2 | Transparent | 25 | 4.1 |
| 2-(d) | lead-2-ethyl hexoate Dibutyltin dilaurate | 0.5 0.5 | tert-butyl perbenzoate | 2 | Transparent | 31 | 4.9 |

($V^1$)Comparison example
(2)Based on the weight of organopolysiloxane and styrene or n-butyl methacrylate.

EXAMPLE 3

(a) About 75 parts of organopolysiloxane containing 95 mol percent of $CH_3SiO_{3/2}$ units and 5 mol percent of $(CH_3)_2$ SiO units, which contains 1 percent Si-bonded hydroxyl groups and 3 percent Si-bonded ethoxy groups, are dissolved in 25 parts of styrene. The clear solution thus obtained is mixed with 0.5 percent by weight of lead-2-ethylhexoate, 0.5 percent by weight of dibutyltin dilaurate and 2 percent by weight of tert-butyl perbenzoate and heated in a metal dish to 110° C. for 4 hours.

(b) The process described in (a) above is repeated, except that the organopolysiloxane, styrene and catalyst mixture is stored without heating for 16 hours at room temperature after which time is solidified into a solid clear mass in the absence of any activity on the part of the perbenzoate.

(c) The procedure described under (b) above is repeated, except that 75 parts of n-butyl methacrylate is substituted for the styrene.

The results are shown in Table 2.

TABLE 2

| Example No. 3 | Appearance of molded object | Bending Resistance $N/mm^2$ | Impact resistance $kJ/m^2$ |
|---|---|---|---|
| a | Transparent | 22 | 2.9 |
| b | Transparent | 25 | 2.7 |
| c | Transparent | 37 | 4.6 |

EXAMPLE 4

About 75 parts of an organopolysiloxane comprising 95 mol percent of $CH_3SiO_{3/2}$ units and 5 mol percent $(CH_3)_2SiO$ units and containing about 1 percent Si-bonded hydroxyl groups and 3 percent Si-bonded ethoxy groups are dissolved in each of the following monomers:

(a) 25 parts methyl methacrylate,
(b) 25 parts divinylbenzene,
(c) 25 parts acrylonitrile,
(d) 10 parts styrene and 15 parts diallylphthalate,
(e) 10 parts n-butyl methacrylate and 15 parts diallylphthalate,
(f) 20 parts methyl methacrylate and 5 parts methacrylic acid,
(g) 25 parts trivinylcyclohexane,
(h) 25 parts crotonic acid allylester,
(i) 12.5 parts n-butyl methacrylate and 15 parts triallylcyanurate,
(j) 22 parts n-butyl methacrylate and 3 parts trimethylolpropanetrimethacrylate,
(k) 22 parts n-butyl methacrylate and 3 parts pentaerythritol tetraacrylate,
(l) 22 parts of n-butyl methacrylate and 3 parts acrylamide.

Each of the solutions thus obtained is mixed with 0.1 percent by weight of lead-2-ethylhexoate and 2 percent by weight of tert-butyl perbenzoate and heated in a metal dish for 4 hours to 110° C. A hard, non-meltable, more or less transparent molded object is obtained from each of the compositions.

When 50 parts of the above described monomers are substituted for 25 parts of the above described monomers, the same results are obtained.

EXAMPLE 5

About 75 parts of an organopolysiloxane comprising 50 mol percent of $C_6H_5SiO_{3/2}$ units and 50 mol percent $CH_3SiO_{3/2}$ units and containing 4 percent Si-bonded hydroxyl groups, are dissolved in 25 parts of styrene. The solution thus obtained is mixed with 0.1 percent by weight of lead-2-ethylhexoate and 2 percent by weight of tert-butyl perbenzoate and heated in a metal dish to 110° C. for 4 hours. A hard, clear, non-meltable molded object is obtained.

EXAMPLE 6

The procedure described in Example 5 is repeated, except that the 25 parts of n-butyl methacrylate are substituted for the styrene. Again, a hard, clear, non-meltable molded object is obtained.

EXAMPLE 7

About 80 parts of an organopolysiloxane comprising 26 mol percent of $C_6H_5SiO_{3/2}$ units, 57 mol percent $CH_3SiO_{3/2}$ units, 8.5 mol percent $(CH_2=CH)CH_3SiO$ units and 8.5 mol percent $(CH_3)HSiO$ units and containing about 1 percent by weight of Si-bonded hydroxyl groups, are dissolved in 20 parts of n-butylacrylate. The solution thus obtained is mixed with 0.1 percent by weight of lead-2-ethylhexoate and 2 percent of tert-butyl perbenzoate and heated in a metal dish to 110° C. for 4 hours. A hard, clear, non-meltable molded object is again obtained.

EXAMPLE 8

About 150 parts of organopolysiloxane comprising 95 mol percent of $CH_3SiO_{3/2}$ units and 5 mol percent $(CH_3)_2SiO$ units containing 1 percent of Si-bonded hydroxyl groups and 3 percent of Si-bonded ethoxy groups, are dissolved in 50 parts of diallylphthalate and 67 parts of xylene. The clear solution thus obtained has a viscosity of 18 cSt at 25° C. The solution is mixed with 2 percent by weight of tert-butyl perbenzoate and heated for 6 hours to 125° C. A milky solution having a viscosity of 2000 cSt at 25° C. is obtained. About 150 parts of this solution are mixed with 90 parts of titanium dioxide, 0.01 percent by weight of aluminum triacetylacetonate and 1 percent by weight of tert-butyl perbenzoate. The mixture is applied with a doctor blade to a steel plate. It is then heated for 1 hour to 200° C. A brilliant, non-sticky film is obtained having a hardness equivalent to a pencil hardness of 5 H.

EXAMPLE 9

About 75 parts of an organopolysiloxane comprising 95 mol percent of $CH_3SiO_{3/2}$ units and 5 mol percent $(CH_3)_2SiO$ units containing 1 percent of Si-bonded hydroxyl groups and 3 percent of Si-bonded ethoxy groups, are dissolved in 25 parts of diallylphthalate and 30 parts of xylene. About 100 parts of the solution thus obtained are mixed with 75 parts of titanium dioxide, and based on the weight of the solution of 0.1 percent of aluminum triacetylacetonate and 1 percent tert-butyl perbenzoate. The mixture is applied with a doctor blade to a steel plate and heated for one hour at 110° C. A hard, brilliant, nonsticky film having a pencil hardness of 5 H is obtained.

EXAMPLE 10

(a) About 80 parts of an organopolysiloxane comprising 80 mol percent of $CH_3SiO_{3/2}$ units, 16 mol percent $(CH_3)_2SiO$ units and 4 mol percent of $(CH_2=CH)CH_3SiO$ units are dissolved in 20 parts of n-butyl methacrylate. The mixture thus obtained has a viscosity of 60 cSt at 25° C. It is then mixed with 10 ppm of chloroplatinic acid based on the weight of the mixture, and 5 parts of methylhydrogen polysiloxane which is end-blocked with trimethylsiloxy groups and has a viscosity of 30 cSt at 25° C., and 1 part of tert-butyl perbenzoate. The clear mixture thus obtained is allowed to stand overnight at room temperature during which time it has solidified and formed a clear, non-meltable gel. The gel is heated for 4 hours to 130° C. A hard, clear, non-meltable, homogeneous molded object is obtained.

(b) The procedure described in (a) above is repeated except that during the preparation of the mixture one part of a solution of cobalt octoate in xylene, containing 6 percent cobalt calculated as the element and based on the solution's weight is added. The mixture is not heated to 130° C. since tert-butyl perbenzoate causes polymerization of the n-butyl methacrylate in the presence of cobalt octoate at room temperature. The clear mixture thus obtained is allowed to stand for 8 days at room temperature after which time it has solidified into a hard, non-meltable molded object having a homogeneous, milky, opaque appearance.

What is claimed is:

1. A process for preparing cross-linked modified organopolysiloxanes which comprises polymerizing at least one monomer having at least one aliphatic multiple bond in the presence of at least one organopolysiloxane capable of being crosslinked and containing at least 40 mol percent of mono-organosiloxane units and a free radical initiator and a catalyst which promotes cross-linking of the organopolysiloxane.

2. The process of claim 1, wherein the organopolysiloxane contains condensable groups selected from the group consisting of hydroxyl groups and alkoxy groups having from 1 to 8 carbon atoms and the catalyst is a condensation catalyst.

3. The process of claim 1, wherein the organopolysiloxane is capable of being cross-linked by the addition of Si-bonded hydrogen atoms to Si-bonded alkenyl groups and the catalyst is one which promotes the addition of Si-bonded hydrogen atoms to Si-bonded alkenyl groups.

4. The process of claim 3, wherein at least one organosilicon compound having at least 2 Si-bonded hydrogen atoms per molecule is added prior to the polymerization of the monomer.

5. The process of claim 1, wherein the condensation catalyst contains at least one organic compound of an element selected from groups two, three, four and mixtures thereof of the Mendeleef Periodic Table.

6. The process of claim 1, wherein the condensation catalyst contains at least one organic compound of an element of the lanthanium series.

7. The process of claim 1, wherein the free radial initiator is a peroxide compound.

8. The process of claim 2, wherein the organopolysiloxane contains hydroxyl groups and the condensation catalyst contains at least one organic compound of an element selected from groups two, three, four and mixtures thereof of the Mendeleef Periodic Table.

9. The process of claim 2, wherein the organopolysiloxane contains alkoxy groups having from 1 to 8 carbon atoms and the condensaton catalyst contains at least one organic compound of an element selected from groups two, three, four and mixtures thereof of the Mendeleef Periodic Table.

10. The process of claim 1, wherein the free radical initiator and the catalyst which promotes cross-linking of the organopolysiloxane is selected so that the cross-linking of the organopolysiloxane is completed before the polymerization of the monomer having an aliphatic multiple bond is completed.

11. A process for preparing cross-linked modified organopolysiloxanes which comprises polymerizing at least one monomer having at least one aliphatic multiple bond in the presence of at least one cross-linked organopolysiloxane containing at least 40 mol percent of mono-organosiloxane units and a free radical initiator.

12. The process of claim 11, wherein the free radical initiator is a peroxide compound.

13. The process of claim 11, wherein the cross-linked organopolysiloxane is obtained from the condensation of an organopolysiloxane containing condensable groups selected from the group consisting hydroxyl groups and alkoxy groups having from 1 to 8 carbon atoms in the presence of a condensation catalyst.

14. The process of claim 13, wherein the condensation catalyst contains at least one organic compound of an element selected from groups two, three, four and mixtures thereof of the Mendeleef Periodic Table.

15. The process of claim 11, wherein the cross-linked organopolysiloxane is obtained from the addition of Si-bonded hydrogen atoms to Si-bonded alkenyl groups in the presence of a catalyst which promotes the addition of Si-bonded hydrogen atoms to Si-bonded alkenyl groups.

16. The process of claim 11, wherein the polymerization is conducted at a temperature of from 50° up to 200° C.

17. The process of claim 11, wherein the polymerization is conducted in the presence of an inert organic solvent.

18. A process for preparing cross-linked modified organopolysiloxanes which comprises polymerizing at least one monomer having at least one aliphatic multiple bond in the presence of an organopolysiloxane capable of being cross-linked and containing at least 40 mol percent of mono-organosiloxane units and a free radical initiator at a temperature of from 50° to 200° C. and thereafter adding a catalyst which promotes cross-linking of the organopolysiloxane.

19. The process of claim 18, wherein the organopolysiloxane contains condensable groups and the catalyst is a condensation catalyst.

20. The process of claim 18, wherein the organopolysiloxane is cross-linked by the addition of Si-bonded hydrogen atoms to Si-bonded alkenyl groups and the catalyst promotes addition of Si-bonded hydrogen atoms to Si-bonded alkenyl groups.

21. The process of claim 20, wherein an organosilicon compound containing at least two hydrogen atoms per molecule is added prior to the addition of the catalyst which promotes cross-linking.

22. The product obtained from the process of claim 1.

* * * * *